United States Patent Office

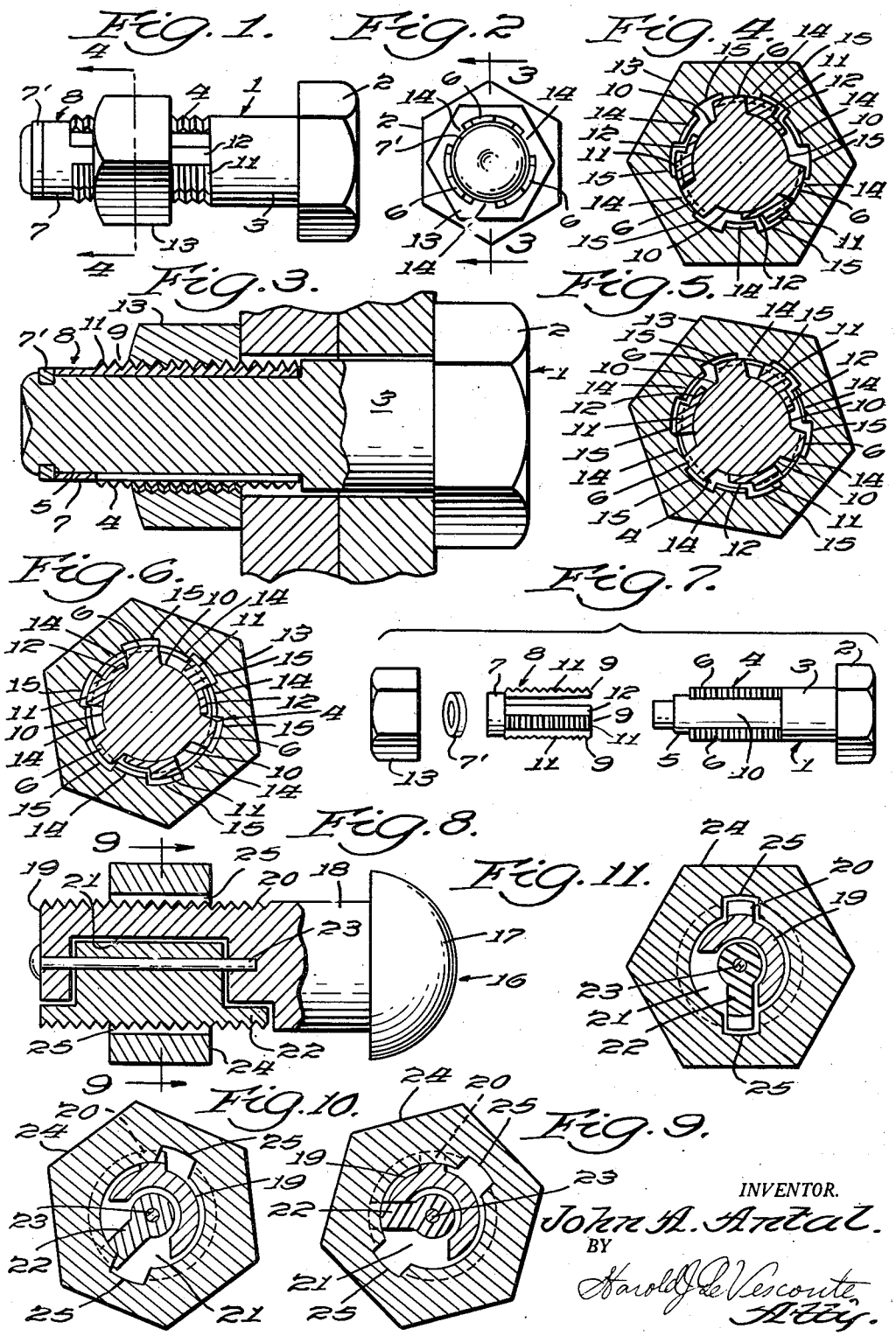

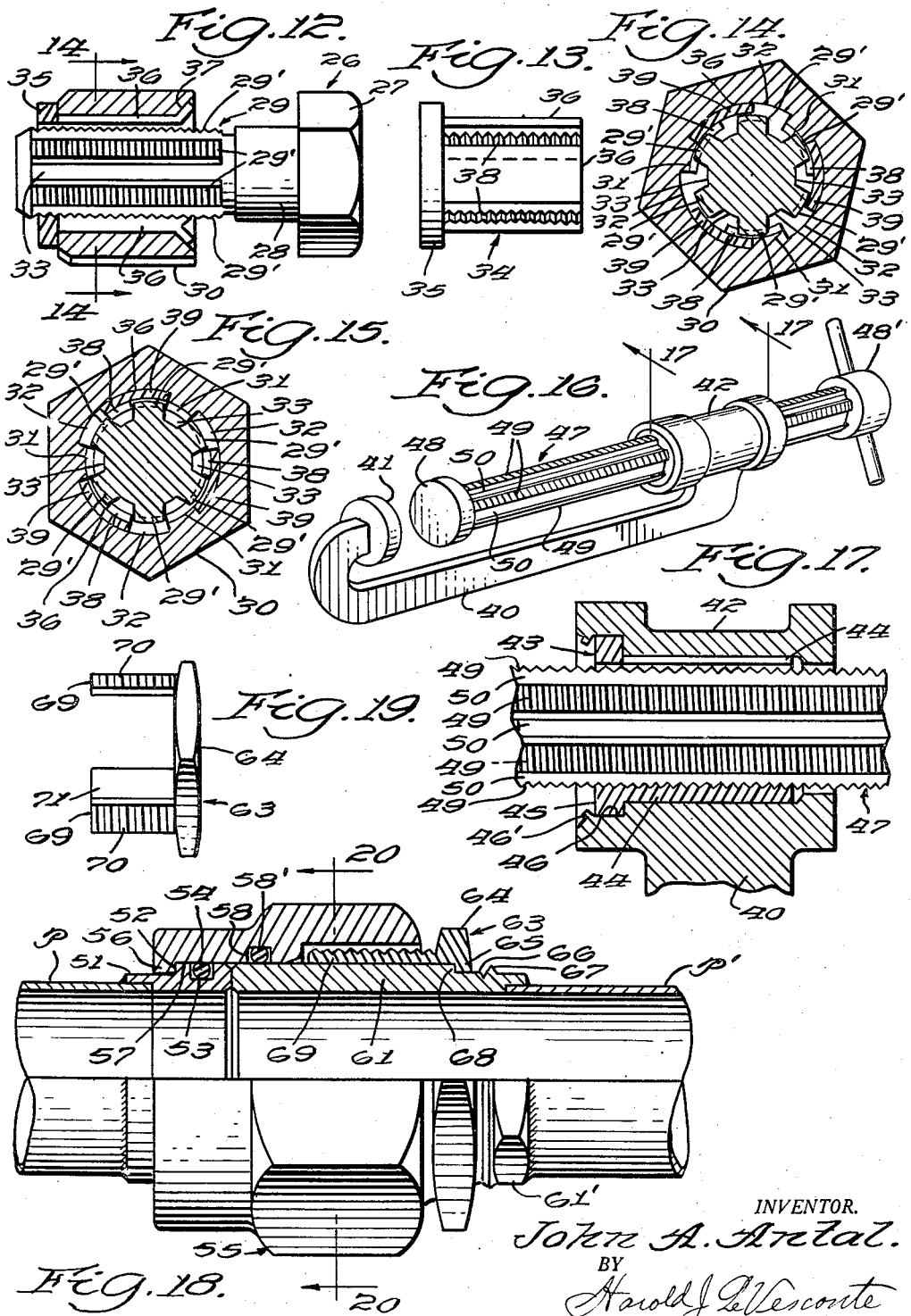

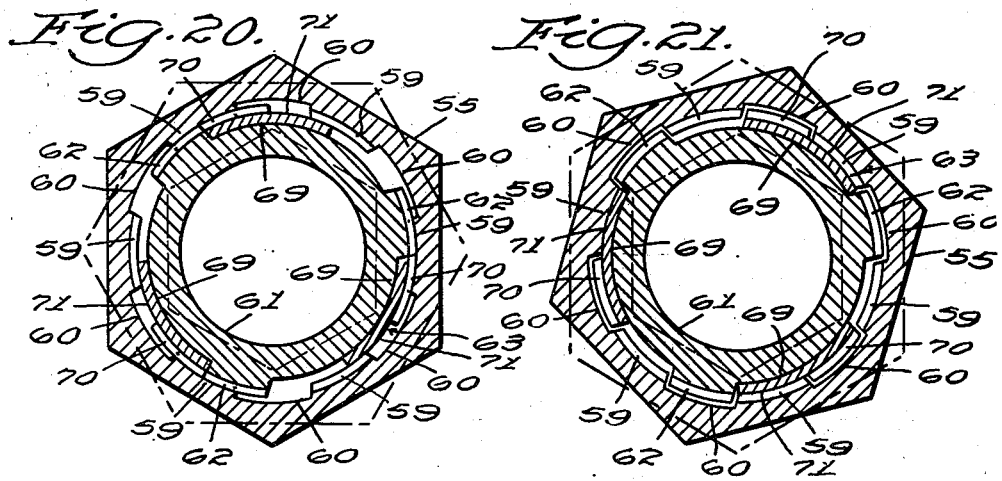

2,828,662
Patented Apr. 1, 1958

2,828,662
QUICK DISCONNECT FASTENER MEANS HAVING CIRCUMFERENTIALLY MOVABLE THREAD SEGMENTS

John A. Antal, Hollywood, Calif.

Application August 13, 1954, Serial No. 449,605

7 Claims. (Cl. 85—32)

This invention relates to fastening devices and more particularly to an improved form thereof operable to quickly connect and disconnect structural elements.

In certain of the hereinafter disclosed embodiments of the invention, the fastener is employed for the interconnection of structural elements. Also, while the capacity for effecting initial interengagement between the fastener components at any one of a plurality of points along the length of the fastener is desirable, this capacity is not of primary importance to the principles of the invention; said principles being the novel manner in which the said quick connection and disconnection of the fastener components is afforded.

The principal object of the invention is to provide a fastener for structural elements comprising interengaging components and which is susceptible of quick interconnection of the components by rotation of one of the components relative to the other in one direction and which is disconnected by a slight opposite relative rotation of said components.

Another object of the invention is to provide a fastener for structural elements comprising threadedly interengaging components capable of initial engagement at any one of a plurality of points by rotation of one component relative to the other in one direction and of disengagement by a slight amount of opposite rotation.

A further object of the invention is to provide a quick disconnect fastener for structural elements comprising interengaging screw threaded components arranged for initial interengagement at any one of a plurality of points along the axial line of the screw threaded portions of the components which is capable of securing the connected elements with increasing tightness by rotation of one component relative to the other in one direction and which is capable of quick disengagement of the components by a slight opposite rotation between them.

Still another object of the invention is to provide a bolt and nut type of fastener capable of initial interengagement at any one of a plurality of points axially of the threaded portions of the bolt and nut components which is capable of acting as a conventional bolt and nut during tightening action and which is released by a slight extent of rotation in the direction opposite that employed in the tightening action.

A still further object of the invention is to provide a connecting means for tubular members such as pipes, hoses or electrical conductor means characterized by screw threaded components capable of interengagement at any one of a plurality of points axially of the threaded portions of the components; said components thereafter being capable of being tightened by relative rotation in one direction and of being disconnected by a slight extent of opposite rotation.

A still further object of the invention is to provide a quick disconnect fastener for structural elements which includes means for indicating the relative position of the interengaging components so that the point of engagement and disengagement between them can be ascertained without reference to the point of interengagement between the components.

Still another object of the invention is to provide a fastener construction in which the foregoing objectives are realized in practice, which is simple to manufacture and reliable in use.

With the foregoing objects in view, together with such additional objects and advantages as may subsequently appear, the invention resides in the parts, and in the construction, combination and arrangements of parts disclosed, by way of example, in the following specification of certain modes of execution of the invention; reference being had to the accompanying drawings which form a part of said specification and in which drawings:

Fig. 1 is a side elevation of a nut and bolt type of fastener embodying the invention, Fig. 2 is an elevational view of the left hand end of Fig. 1, Fig. 3 is an enlarged sectional view taken on the line 3—3 of Fig. 3, Figs. 4, 5 and 6 are enlarged, transverse sectional views taken on the line 4—4 of Fig. 4 and showing, respectively, in fully engaged, partially engaged and disengaged positions, Fig. 7 is an exploded side elevation of the component parts of the form of the invention shown in Figs. 1 through 6, Fig. 8 is a side elevation, partly in medial section, showing a second form of a bolt and nut combination embodying the present invention, Figs. 9, 10 and 11 are transverse sectional views taken on the line 9—9 of Fig. 8 and showing the component parts in fully engaged, partially engaged and disengaged positions, respectively, Fig. 12 is a side elevation partly in medial section, showing a third form of nut and bolt combination embodying the invention and characterized by the reversal of the component parts, Fig. 13 is a side elevation of the member which is mounted in the nut component and relatively movable thereto and which will for convenience be designated as the "spider" member or component whether mounted in the nut or on the bolt component of the combination, Figs. 14 and 15 are slightly enlarged transverse sectional views taken on the line 14—14 of Fig. 12 showing the parts in partially engaged and disengaged positions, Fig. 16 is a perspective view of a C-clamp embodying the invention, Fig. 17 is an enlarged, fragmentary sectional view taken in the plane indicated by the lines 17, 17 in Fig. 16, Fig. 18 is a side elevation of a modified form of the invention applied to the coupling of a pair of tubular members, Fig. 19 is a side elevation in reduced scale of the spider component of the form of the invention shown in Fig. 18, Figs. 20 and 21 are transverse sectional views taken on the line 20—20 of Fig. 18 and showing the components in partially engaged and disengaged positions, respectively, Fig. 22 is a rear end elevation of a fastener assembly embodying the invention adapted for uses in which the fastener components are separately mounted in the structural elements that are to be connected thereby, Fig. 23 is a sectional view taken on the line 23—23 of Fig. 22, Figs. 24 and 25 are sectional views taken on the line 24—24 of Fig. 23 showing the interengaging components in engaged and disengaged positions, respectively, Fig. 26 is an enlarged fragmentary sectional view taken on the line 26—26 of Fig. 22, Fig. 27 is a side elevation of the cam element employed in the form of the invention shown in Figs. 22, et seq; and Fig. 28 is an exploded side elevation of the component sub-assemblies of the form of the invention shown in Figs. 22 through 25.

Referring first to the form of the invention shown in Figs. 1 through 7, there is shown a bolt 1 having a head 2, a shank portion 3, a threaded portion 4 and a spider supporting shoulder 5. The threaded portion 4 is divided into three equally radially spaced lands 6 which are spaced apart radially a distance which is slightly greater than three times the widths of the lands. Mounted on the shoulder 5 is a ring 7 comprising the base portion of a spider element 8 having three arms 9 of approximately twice the width of the lands each lying in one of the spaces 10 between the lands 6 and, if desired, slightly radially outwardly from the axial line of the bolt component at their free ends as best shown in Fig. 7 to assure frictional engagement with the threads of the nut. Ordinarily, the frictional engagement between the spider and the nut is sufficient to effect the desired action without such flaring. The end of the shoulder portion 5 is hollowed out and the rim thereof is spun over with an interposed washer 7' to secure the base ring 7 on the bolt while permitting it to oscillate within the limits imposed by the engagement of the side edges of the arms 9 with the edges of the lands 6. As shown in Figs. 4, 5, 6 and 7 the outer surfaces of each of the arms 9 is divided into a threaded land portion 11 which is helically aligned with the threads on the adjacent land 6 of the bolt component at the edge of the land which is in advance as the bolt is screwed into the nut component, and an unthreaded portion 12 which is of slightly less radial distance from the axial line of the bolt than the root of the threads on the lands 6 and which serves as a spacer to align the lands for linear disengagement of the bolt and nut components.

The nut component 13 is internally threaded and the threads are separated into six equally spaced lands 14 separated by unthreaded spaces 15 of slightly greater radial distance from the axial line of the nut than the root diameter of the lands 14. When a nut and bolt are to be connected the nut is slipped on the bolt with the lands 14 thereof in alternation engaging a space overlying the unthreaded portion 12 of the arms 9 and a portion of a space 10 lying between adjacent side edges of a land 6 and the unthreaded portion 12 of an arm as best shown in Fig. 6. When the nut has been moved along the bolt as far as it will go, it is turned in a counterclockwise direction, or alternatively, the bolt is turned in a clockwise direction as viewed in Figs. 4, 5 and 6 (assuming right hand threads to be used) and the first portion of such turning movement carries the spider member with the nut to bring the spider threaded lands against the sides of the threaded lands of the bolt; the outward flaring of the arms 9 providing sufficient frictional engagement with the nut to assure such action. In Fig. 5 the movement is shown in progress and in Fig. 4 it is shown completed. In this position the lands of the nut are never in registry with equivalent open spaces on the bolt component, wherefore the nut can be continued to be screwed on to the bolt to the extent desired. When the fastener is to be released the first relative motion between the nut and bolt in the opposite rotative direction will cause the spider to rotate until the outer edges of the unthreaded lands 12 contact the adjacent sides of the lands 6 of the bolt component thus (see Fig. 6) defining alternately spaced threaded lands and unthreaded spaces between them and when the threaded lands of the nut component are aligned with the unthreaded portions of the bolt and spider, the nut can be moved off the bolt without further rotative motion.

Referring next to Figs. 8 through 11, there is shown a simplified form of the invention which is generally similar to the first described form in that it relates to a bolt and nut combination. In this form of the invention a bolt 16 including a head 17 and shank portion 18 is provided with a nut-engaging body portion 19 which occupies about three quarters of the circumference thereof and which carries a threaded land 20. The portion 19 is provided with a substantially segmental shaped, longitudinally extending recess 21 in which a complemental threaded element 22 is mounted for oscillation about a pivot pin 23 disposed in the axial line of the bolt and the element is movable in said recess between a position diametrically opposite the land 20 to a position substantially at right angles thereto. The nut component 24 is internally threaded and is provided with diametrically opposite slots 25, 25 which are of a depth sufficient to permit the nut to be moved freely endwise of the bolt when the element 22 is moved to a position as in Fig. 11 diametrically opposite the land 20 on the bolt. Upon rotation between the parts to screw the bolt into the nut, the element 22 will swing to the position shown in Fig. 9 in which it is less than a half revolution from the land 20 and consequently the slots 25 in the nut will never be in registry with the two threaded portions of the bolt. Upon reverse rotation the member 22 will swing through the position shown in Fig. 10 to the position shown in Fig. 11 whereupon the nut will be released and can be removed from the bolt.

The modification of the invention shown in Figs. 12 through 15 shows that the invention is not limited to constructions in which the spider element is mounted on the bolt component, but may be used in the nut component as readily where that arrangement is desirable. In this form of the invention the bolt 26 is provided with a head 27, a shank portion 28 and a threaded portion 29 divided into six equally spaced lands 29'. The nut 30 is provided with three complementary threaded lands 31 spaced from each other by radial spaces 32 which are about three times the widths of the lands. The spaces 33 on the bolt between adjacent threaded lands have a radial dimension from the axial line of the bolt which is slightly less than half the root diameter of the bolt threads and the spaces 32 on the nut between adjacent threaded lands have a radial dimension from the axial line of the bolt which is slightly greater than half the outer diameter of the bolt threads. Mounted for oscillation on the nut and bearing on the surfaces of the spaces between the threaded lands thereof is a three armed spider element 34 having a base collar 35 bearing on one end of the bolt and having the arms 36 thereof extending through the nut and flared outwardly to engage the chamfer 37 at the end of the nut opposite the end engaged by the base 35. Each arm 36 is about twice the width of the lands 31 of the nut and comprises a threaded land portion 38 and an unthreaded portion 39 which just clears the outer diameter of the bolt threads.

The action is essentially the same as described in connection with the first form of the invention. The nut is moved upwardly along the bolt as far as desired (see Fig. 15) and then the bolt or nut is rotated in a direction to screw the bolt into the nut. The first portion of this movement causes the threads of the bolt to engage the threaded lands of the arms 36 and move them into engagement with the threaded lands 31 of the nut and to engage the threads. Since the threaded lands 31 and 38 are now side by side the bolt and nut can be screwed together as far as desired without danger that the lands will be in such position as to allow the nut to slip from the bolt. When the nut and bolt are to be disengaged, the first portion of rotation in a direction to unscrew the bolt and nut causes the spider element 34 to move as far as it will go in the opposite direction (see Fig. 15) and when the lands 29 of the bolt are aligned with the portions of the spaces 34 which are not then covered by the arms 36 and the unthreaded portions 39 of the arms 36, the nut can be removed from the bolt without further rotation.

Figures 16 and 17 illustrate the application of the invention to a C-clamp. In this application of the invention, a C-clamp frame 40 is provided with a work engaging surface 41 and an integrally formed nut portion 42; the nut portion being provided with three radially spaced lands comparable to the lands 31 in the preceding form of the invention. Mounted for oscillation within the nut portion 42 is a spider element 43 having arms 44 and a base 45 seated in a recess 46 in the nut element 42 and secured therein by any suitable means such as spinning inwardly a portion of the nut element as shown at 46'. The screw component 47 of the clamp carries a work engaging surface 48 at one end and a capstan handle 48' at the other end. The body of the screw is threaded and comprises in the form illustrated six equally spaced lands 49 having spaces 50 of substantially equal width therebetween. These lands and spaces are comparable to the lands 29' and intervening spaces 33 in the preceding form of the invention.

Figs. 18 through 21 show the application of the invention to a coupling for tubular elements such as a hose coupling means or a pipe joint. In the illustrated embodiment a pipe P is provided with a sleeve element 51 having a shoulder 52 and a peripheral groove 53 carrying a gasket element 54. Freely rotatably mounted on the sleeve element 51 is a nut element 55 having an inturned annular flange 56 engaging the shoulder 52 and an internal cylindrical face 57 engaging the gasket 54. The nut element overhangs the end of the sleeve element and closely adjacent thereto is provided with an internal annular groove 58 carrying a gasket element 58'. Beyond this gasket element, the nut element terminates in an internally threaded portion comprising six equally spaced threaded lands 59 with unthreaded spaces 60 of equal width therebetween.

Mounted on the pipe P' to be connected to the pipe P is a sleeve element 61 having a polygonal wrench engaging surface 61' and having an outer diameter closely fitting the inside of the nut element, engaging the gasket element 58' and abutting the end of the sleeve element 51. The external surface of the sleeve element 61 is provided with three externally threaded lands 62 spaced apart at radial distances equal to three times the width of the lands. Mounted for oscillation on the exterior of the sleeve element 61 is a spider element 63 having an externally polygonal base portion 64 including an annular inward-extending rib 65 mounted on a reduced diameter portion 66 of the sleeve element 61 and secured against excessive endwise movement thereon by an outwardly spun rib 67 on the sleeve element 61. The juncture of the threaded outer diameter and the reduced diameter portions of the sleeve element 61 forms a shoulder 68 against which the inner side face of the rib 65 bears when the coupling is tightened. The spider element 63 carries three equally radially spaced arms 69 each of which comprises a threaded land portion 70 and an unthreaded portion 71.

The mode of interengagement of this form of the invention is similar to that described in connection with the first described form of the invention. When the pipes or other members to be connected are brought together, the nut element 55 is rotatably aligned with the lands of the sleeve element and the spider element and then is moved longitudinally of the joint as far as the position of the ends of the pipes will allow. It is then rotated in a direction to screw it on to the threads of the spider and the sleeve element 61 and incident to the start of such rotation, the spider element will rotate with the nut element until its lands adjoin the lands 62 of the sleeve element 61 (see Fig. 20) wherefore, the tightening operation can be continued to the extent desired. When the coupling is to be released, the first portion of opposite rotation will move the spider element to the position shown in Fig. 21 and when the lands 59 of the nut element are in alignment with the unthreaded portions of the spider element and of the sleeve element 61 as shown in that figure, the nut element can be moved longitudinally of its pipe and the joint be disconnected. It is particularly to be noted in this form of the invention that the pipes are not required to be rotated in forming the connection and that the gaskets are so arranged that leakage from the joint is eliminated. Since the joined elements are not rotated, this form of the invention is also useful in forming the connection between electric conductors of the multiple pin and socket type commonly known as "cannon plugs." In this form of the invention also, the threaded lands of the spider element and sleeve 61 can be so disposed with respect to the polygonal surfaces thereof (here shown as hexagonal) that when the flat sides thereof are in alignment incident to rotation to disconnect the connected members, the threaded lands are out of engagement with each other and the joint is ready to be pulled apart. This is indicated in Fig. 21 wherein the position of the hexagonal surfaces of the spider element base 64 and the sleeve 61 are indicated in broken lines.

Figs. 22 through 28 illustrate the use of the invention for applications such as the securing of cover plates to access openings in aircraft and like uses wherein as distinguished from the last described embodiment of the invention the surfaces to be joined are not surrounded by the threads of the fastener. In the illustrated embodiment a structural member M is to be detachably connected to a second structural member M'.

In this embodiment the screw component 73 includes a countersunk head 74, a shank 75 and a threaded body portion 76 in which the threads comprise six equally spaced lands 77 separated by spaces 78 of substantially equal width. The screw shank and head fit within a ferrule 79 secured in the countersunk portion 80 of the member M by integral spring tongues 81 which spring inwardly incident to entry of the ferrule into the hole in the member M and then spring outwardly to prevent removal of the ferrule. The inner diameter of the ferrule is sufficient to allow free endwise movement of the screw 73 therein and at the distal end of the threaded lands 77 the screw element is provided with spur elements 82 which extend radially outwardly sufficiently to prevent removal of the screw from the ferrule.

The nut component 83 is provided wtih a flange 84 secured to the face of the member M' by rivets 85 and the inner face of the body portion of the nut component is provided with three equally spaced threaded lands 86 which are spaced apart a distance approximately three times the width of the lands. The distal end of the nut component terminates in a counterbored portion 87 at the inner end of which rests the rear face of the base portion 88 of a spider element 89 including three arms 90 which are mounted for oscillation in the spaces 91 between adjacent threaded lands 86 of the nut element; each of said arms including a threaded land portion 92 and an unthreaded portion 93 approximately equal in width to the lands 92. Also mounted in the counterbore 87 outside of the spider element base 88 is a washer 94 having a hole 95 therethrough which has a contour equivalent to and slightly larger than the cross sectional contour of the threaded portion 76 of the screw. The outer end of the nut element includes two spring tongues 96, 96 disposed diametrically opposite each other and the remainder of the end of the nut is turned down over the washer 94 as best shown at 97 in Fig. 26 to hold the washer and spider element in place in the nut component.

The outer periphery of the washer 94 is provided with a series of six equally radially spaced notches 98 and the tongues 96 are each formed with a mating detent portion 99 positioned so that when the tongue detents are seated in one of the notches the tongue extends parallel to the axis of the screw and spider. The periphery of the base 88 of the spider element 89 is provided with a pair of notches 100, 100 disposed at diametrically opposite points thereon; said notches inclining inwardly and rearwardly from the front face of the base 88 and at the opposite face of said base terminating in the contour of the notches 98.

In use and assuming that the parts to be connected are as positioned as shown in Fig. 28, the members M and M' are brought together and the screw inserted into the nut as far as it will go; the screw being of sufficient length so that the threaded portion thereof will extend through the washer 94. Upon rotation of the screw to screw it into the nut, the spider element will rotate with the screw until the threaded lands 92 thereof engage the sides of the threaded lands 86 of the nut component after which the tightening may proceed to the desired degree. Rotation of the screw will also rotate the washer 94 and the spaces between the notches 98 therein will spring the tongues 96 outwardly as best shown in Fig. 25 allowing the spider element to effect its movement toward the lands and out of the range of the tongue action. Upon opposite rotation of the screw to release the members M and M', the spider element will move back into alignment with the detents 99 and the user will know that upon feeling release of resistance to rotation occasioned by entry of the detents simultaneously into any pair of the notches 98 on the washer and the pair of notches 100 on the spider that the screw and nut components are in position for separation without further rotation of the screw. It will be obvious that all other times the detents will be prevented from entering the notches 98.

Thus there has been created a fastening means which may be initially engaged by rotation of one part relative to another in one direction and in which continuous rotation in said one direction will secure the ports connected thereby with increasing tightness while at no time placing the parts in position for release.

Rotation in the opposite direction for only a slight portion of a revolution effects immediate release of the interengaging parts regardless of the extent to which they have been rotated in effecting their engagement. The invention is susceptible of a wide range of uses some of which have been illustrated and described in detail to illustrate the various ways in which the principles of the invention may be usefully employed. It will be obvious that any form of thread or of the equivalents of threads may be employed.

Notwithstanding the illustrated uses of the invention and the manners by which such uses may be achieved, it is appreciated that changes and modifications will suggest themselves to others skilled in the art both for uses similar to those illustrated as well as for other uses. The invention, therefore, is not to be deemed to be limited to the exact modes of execution above disclosed by way of example, and it will be understood that the invention embraces all such changes and modifications in the parts, and in the construction, combination and arrangement of parts as shall come within the purview of the appended claims.

In said claims the term "screw" component has been adopted as a generic term for all externally threaded components in the various illustrated forms of the invention.

I claim:

1. A fastener device comprising a screw component and a nut component threadedly engageable and disengageable therewith; said screw component having a threaded portion comprising a plurality of threaded lands formed integrally therewith and equally spaced circumferentially from each other, a spider element mounted on said screw element for oscillatory movement and including a plurality of equally peripherally spaced arm portions disposed one each in each of said spaces between said lands and each of said arm portions having on the exterior face thereof a threaded land portion bordering one edge thereof and having a threaded surface of approximately the same area as said fixed land portion and arranged to form a continuation of the fixed threaded land adjacent to said one edge and another unthreaded portion extending between the other edge of said arm portion and the said threaded land portion, and said nut component having complementarily formed internal threads divided into a plurality of equally spaced lands, said lands being spaced from each other by unthreaded spaces which are not less in width than the widths of the lands on said screw component and having a radial dimension sufficient to clear the threads on said screw.

2. A fastening device as claimed in claim 1 including means for the visual determination of the relative rotative positions of said screw component and said spider element.

3. A fastener device comprising a screw component and a nut component threadedly engageable therewith; said nut component including an internally threaded portion divided into a plurality of threaded lands separated by spaces which are at least the widths of the individual lands; said spaces having surfaces generated about the axial line of said nut and providing bearing surfaces for a spider element comprising a ring-like base loosely secured in one end of said nut element and disposed with its axis substantially coincidental with the axis of said nut component; said ring-like base having a plurality of arms disposed one each in each of said spaces between said threaded lands and each of said arms including a threaded land portion bordering one edge thereof and arranged to form a continuation of the threads on the one of said threaded lands adjacent to said one edge and an unthreaded portion having a radial dimension which is slightly greater than half the root diameter of the threads on said lands; the widths of said lands circumferentially of said nut component being equal and the corresponding widths of said unthreaded portions of said arms being slightly greater than the widths of said lands, and said screw component having a complementarily threaded body divided into a plurality of lands equally spaced from each other by spaces slightly greater than the widths of said lands on said nut component, said spaces between said lands on said screw component having a radial dimension sufficient to clear the threads on said lands on said nut component.

4. A fastener device as claimed in claim 3 in which the threaded lands on said arm portions of said spider are disposed along that edge of their respective arm portions toward which said nut component is turned incident to screwing it on to said screw component.

5. A fastener device as claimed in claim 3 in which said spider is movable relative to said nut by frictional engagement with said screw component to bring the edges of said arms bordering the unthreaded portions thereof into engagement with the adjacent fixed lands, and permit relative movement of said components.

6. A fastener device as claimed in claim 5 in which said nut component includes means actuated by rotation of said screw component to enable a user to sense the point at which said components are in position for relative axial movement.

7. A fastener device as claimed in claim 6 in which said position sensing means includes a spring detent on said nut component, a series of peripherally spaced notches on the base of said spider element engageable by said detent, and means mounted in said nut component, said means being rotatable by rotation of said screw component and adapted to maintain said detent out of engagement with said notches at all times when said screw component is rotated in one direction and to allow said detent to enter one of said notches only upon reverse rotation of said screw component.

References Cited in the file of this patent

UNITED STATES PATENTS

| | | |
|---|---|---|
| 1,391,633 | Hazelton | Sept. 20, 1921 |
| 2,138,245 | Smith | Nov. 29, 1938 |